H. M. MYERS.
FLY TRAP.
APPLICATION FILED FEB. 11, 1916.
1,184,486.
Patented May 23, 1916.
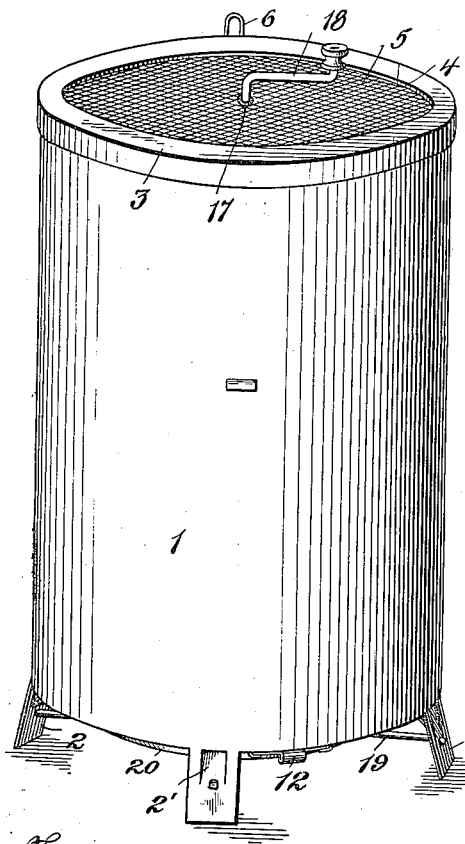
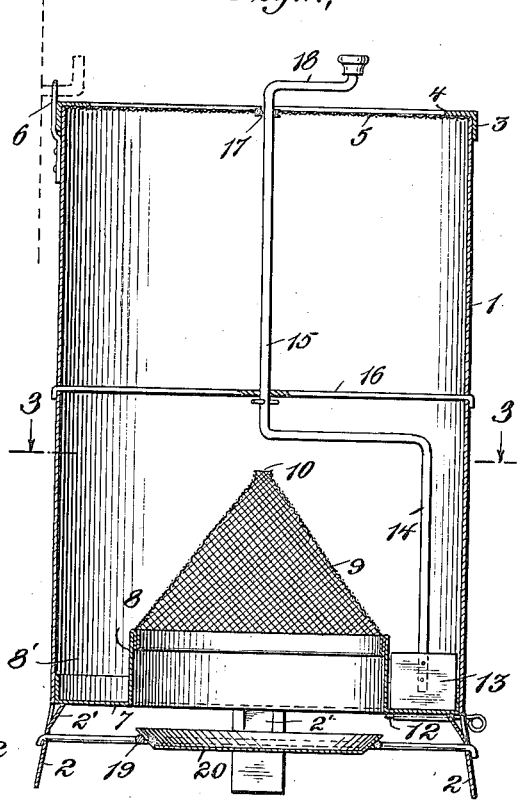
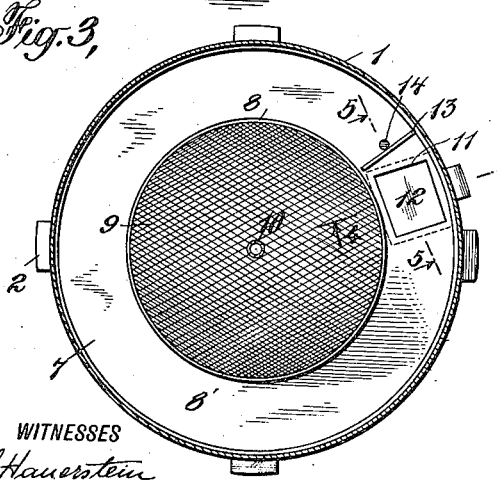
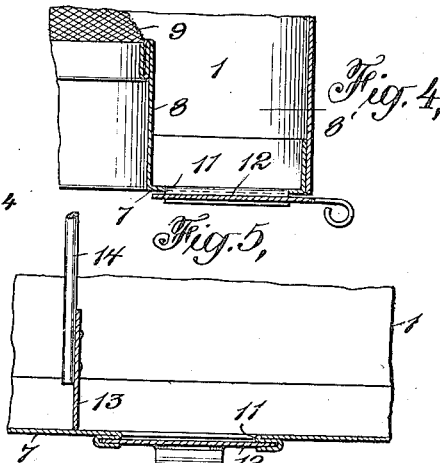
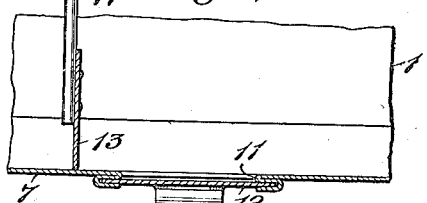
WITNESSES
INVENTOR
H. M. Myers.
BY
ATTORNEYS

UNITED STATES PATENT OFFICE.

HARRY MASON MYERS, OF SAN RAFAEL, CALIFORNIA.

FLY-TRAP.

1,184,486.

Specification of Letters Patent.

Patented May 23, 1916.

Application filed February 11, 1916. Serial No. 77,613.

*To all whom it may concern:*

Be it known that I, HARRY M. MYERS, a citizen of the United States, and a resident of San Rafael, in the county of Marin and State of California, have invented a new and Improved Fly-Trap, of which the following is a full, clear, and exact description.

This invention relates to fly traps, and has for its general objects to provide a fly trap of comparatively simple and inexpensive construction, of durable design, and having simple and effective means for enabling the trap to be readily cleaned out.

A more specific object of the invention is the provision of a fly trap of that type having bait-holding means and an entrance at its bottom and provided with a discharge opening normally closed by a door, and within the trap is arranged a novel device for scraping up the dead flies and discharging them through the opening, the said scraper being operated from the top of the trap.

Still another object is the provision of a trap in which the body is made of imperforated sheet metal and having netting at the top and bottom, the imperforated sheet metal wall serving to prevent the wind from passing horizontally through the trap and distributing germs into the surrounding air from the dead flies caught within the trap.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the trap; Fig. 2 is a vertical section thereof; Fig. 3 is a horizontal section on the line 3—3, Fig. 2; Fig. 4 is an enlarged sectional view on the line 4—4, Fig. 3; and Fig. 5 is a sectional view on the line 5—5, Fig. 3.

Referring to the drawing, 1 designates the cylindrical body of the trap which is preferably made of imperforate sheet metal and has at its bottom integral supporting legs 2. The top of the body is provided with a cap-like cover 3 in the form of a ring having an opening 4 across which is stretched a piece of wire netting 5. If desired the trap can be supported on a hook by means of a loop 6, as shown in Fig. 2. The bottom 7 is in the form of a ring set into the bottom of the body or casing 1, and this ring has an upstanding cylindrical flange 8 between which and the body 1 is formed an annular well 8' into which the dead flies drop. Fastened to the top edge of this flange is a cone 9 of wire mesh, and at the apex is an opening 10 whereby the cylinder 8 and cone 9 form an entrance for the flies. In the bottom 7 is an opening 11 that is normally closed by a slide valve 12, and when this slide valve is open the dead flies can be swept out of the opening. For doing this a scraper 13 is mounted to run around in the well 8' to scrape up the dead flies and discharge them out of the opening 11. This scraper is mounted on an offset arm 14 of a central shaft 15, which shaft is journaled in a cross bar 16 fastened diametrically of the casing 1 and in an eyelet 17 in the netting 5 at the top of the casing, there being an operating crank 18 on the upper end of the shaft. Under the bottom 7 is a frame 19 that carries a bait pan 20, such frame being supported by the legs 2. The flies are enticed to the trap by the bait and naturally the flies fly upwardly into the cone 9 and finally enter the trap through the opening 10. To assist in holding the bottom in place the legs 2 have lugs 2' stamped out therefrom and they engage under the bottom 7.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A fly trap comprising a casing having an entrance, a well at the bottom provided with an opening, a scraper mounted in the casing and movable over the bottom to scrape up the flies and discharge them out of the opening, and a valve normally closing the opening.

2. A fly trap comprising a casing having an entrance at its bottom and a well surrounding the entrance for collection of the dead flies, said well being provided with a discharge opening, a scraper movably mounted in the casing and arranged to scrape the flies in the well and discharge them through the opening thereof, and a valve normally closing the opening.

3. A fly trap comprising a casing having a netting across its top, a bottom having an entrance opening and a discharge aperture, a flange around the opening and extending into the casing, a cone of netting supported on the flange to form an entrance into the casing, a scraper movable on the bottom for scraping the flies together and discharging them through the aperture, a valve for the aperture, an operating shaft mounted in the casing and having an offset arm to which the scraper is fastened, and a crank on the upper end of the shaft and disposed outside the casing.

4. A fly trap comprising a body made of sheet metal and formed with integral legs having lugs stamped out therefrom, a bottom disposed in the body and engaged by the lugs, said bottom having an entrance for the flies, and having an aperture for discharging the dead flies, and means in the casing for gathering the dead flies and discharging them through the said aperture.

5. A fly trap comprising a body having legs, an entrance means at the bottom of the body, a frame supported by the legs, a bait holder carried by the frame, said bottom having an aperture disposed to one side of the bait holder, a valve controlling the aperture, and a movable device within the body for scraping up the dead flies and discharging them through the aperture.

6. A fly trap comprising a body open at its top and having an entrance at its bottom and also a discharge aperture at its bottom, a netting stretched over the top of the body and having a central eyelet forming a bearing, a cross bar in the body and having a bearing, a shaft journaled in the said bearings, means on the upper end of the shaft for operating the same, and a scraper carried by the shaft and scraping the dead flies on the bottom of the body to discharge them through the aperture.

In testimony whereof I have signed my name to this specification in the presence of two subscribing witnesses.

HARRY MASON MYERS.

Witnesses:
ESTELLE E. BOYD,
EVA A. LYON.